United States Patent [19]

Neyens et al.

[11] Patent Number: 5,174,038

[45] Date of Patent: Dec. 29, 1992

[54] METHOD AND APPARATUS FOR PROFILING TERRAIN

[75] Inventors: Ronald J. Neyens, Pleasanton; Porfirio L. Nogueriro, Milpitas, both of Calif.

[73] Assignee: FMC Corporation, Chicago, Ill.

[21] Appl. No.: 650,268

[22] Filed: Feb. 4, 1991

[51] Int. Cl.⁵ .............................................. G01C 7/04
[52] U.S. Cl. ....................................... 33/321; 33/331; 33/333; 33/775
[58] Field of Search ................ 33/521, 775, 333, 331, 33/338

[56] References Cited

U.S. PATENT DOCUMENTS

| | | | |
|---|---|---|---|
| 2,524,934 | 10/1950 | Silverman | 33/775 |
| 3,151,235 | 9/1964 | Greenshields | 33/331 X |
| 3,797,124 | 3/1974 | Easterling et al. | 33/331 |
| 4,606,629 | 8/1986 | Hines et al. | 33/265 X |
| 4,788,773 | 12/1988 | Palsgard et al. | 33/775 X |

Primary Examiner—Harry N. Haroian
Attorney, Agent, or Firm—Michael Lee; R. C. Kamp; R. B. Megley

[57] ABSTRACT

A terrain profiling apparatus for quick and inexpensive profiling of relatively large areas of ground. A prime mover pulls a sled across a terrain to be profiled. A gyroscope on the sled indicates slope and a measuring device records distances moved. Slope and distance signals are used by a computer to indicate terrain profile.

3 Claims, 3 Drawing Sheets

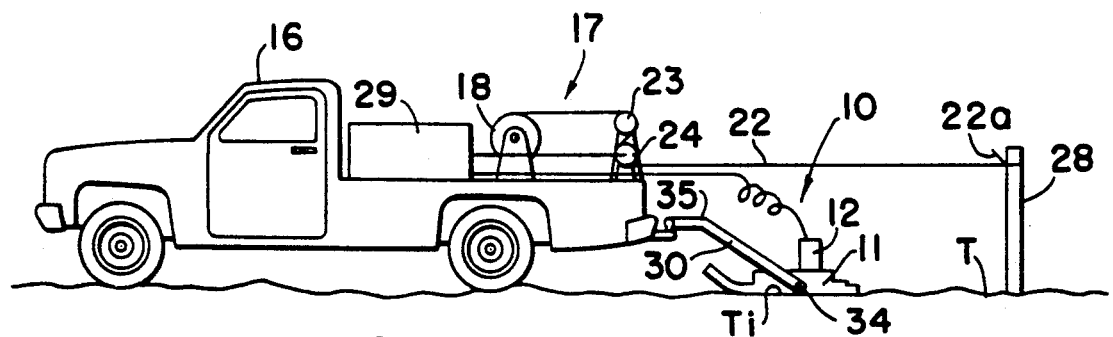
FIG_1
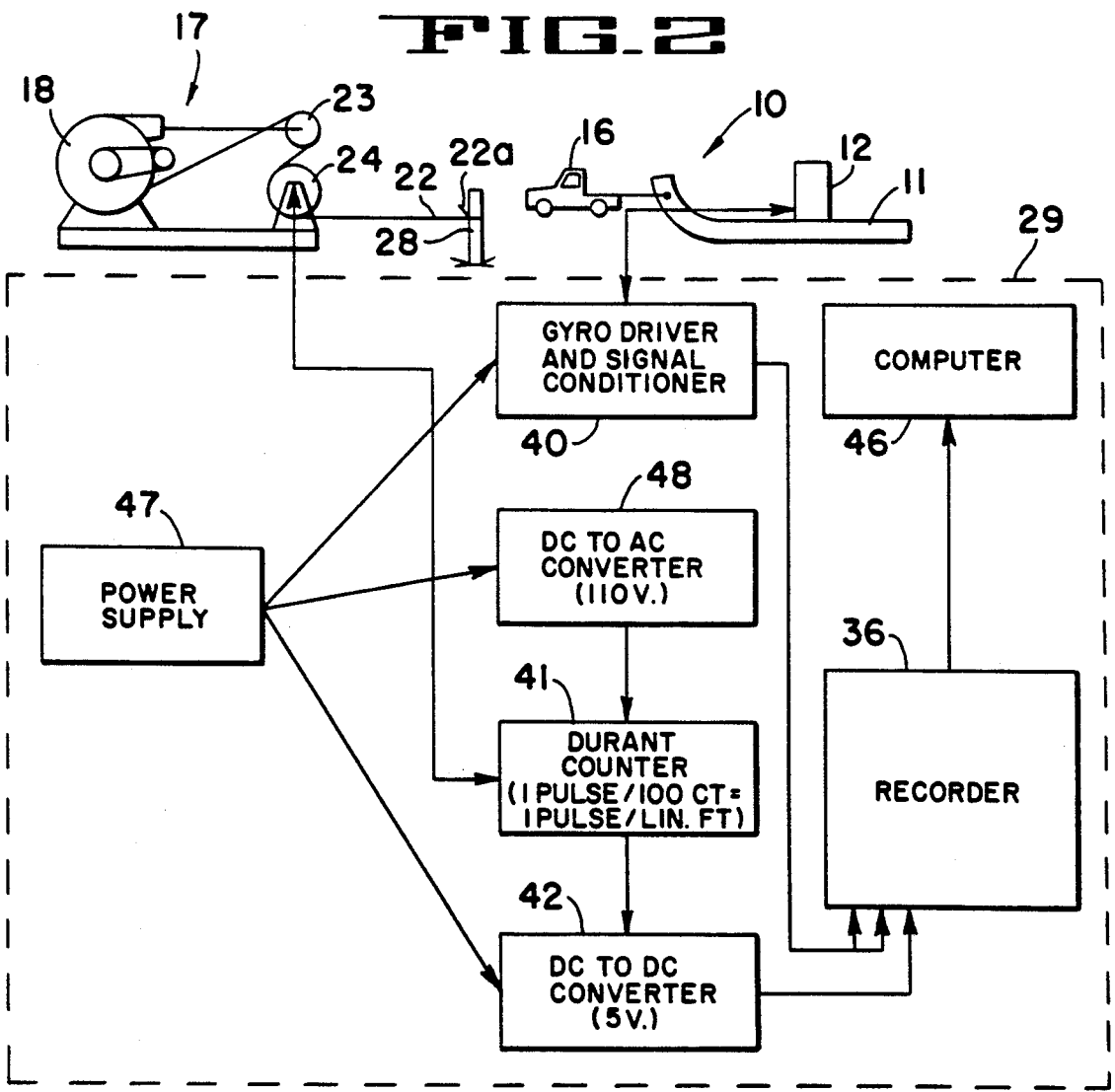
FIG_2

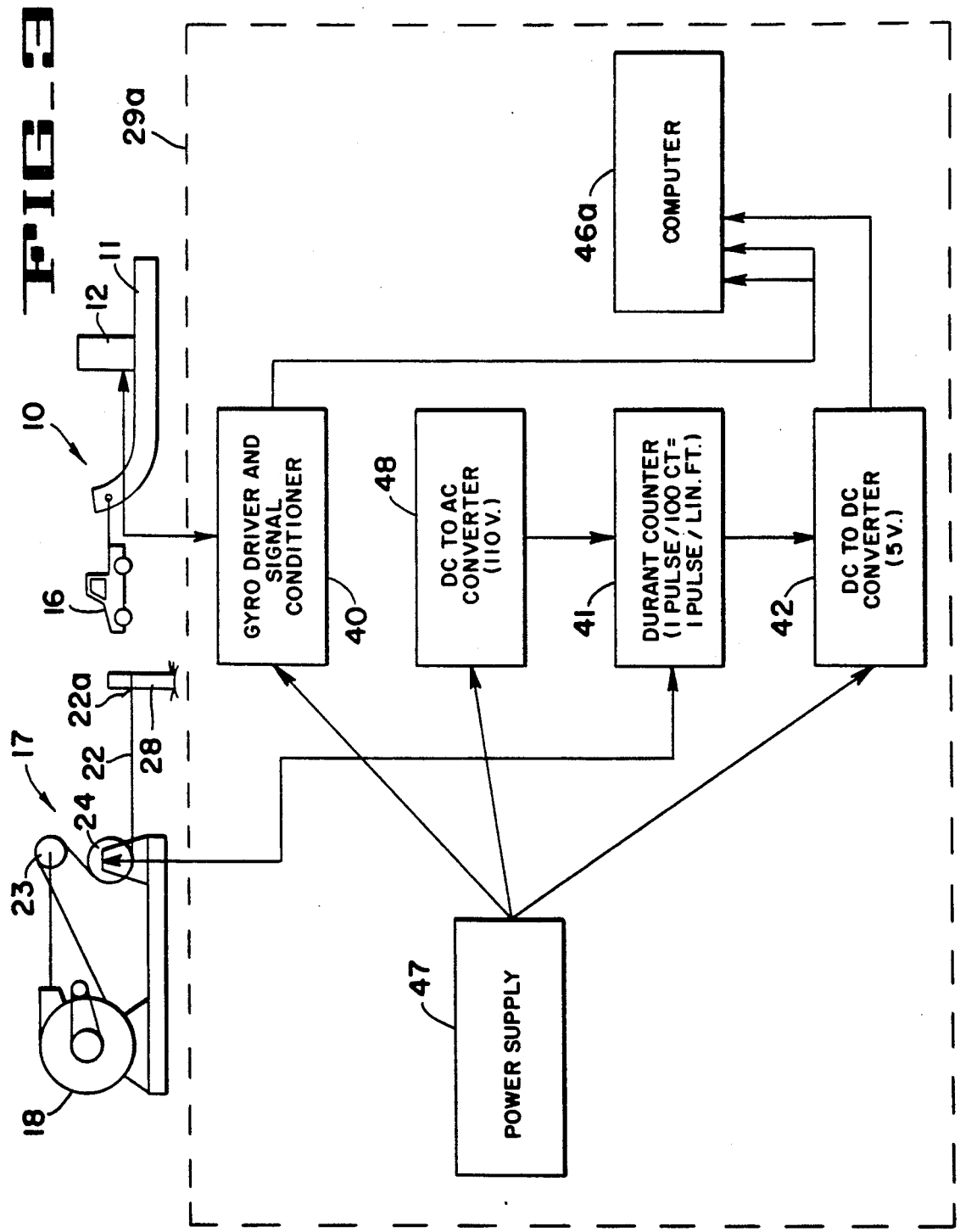

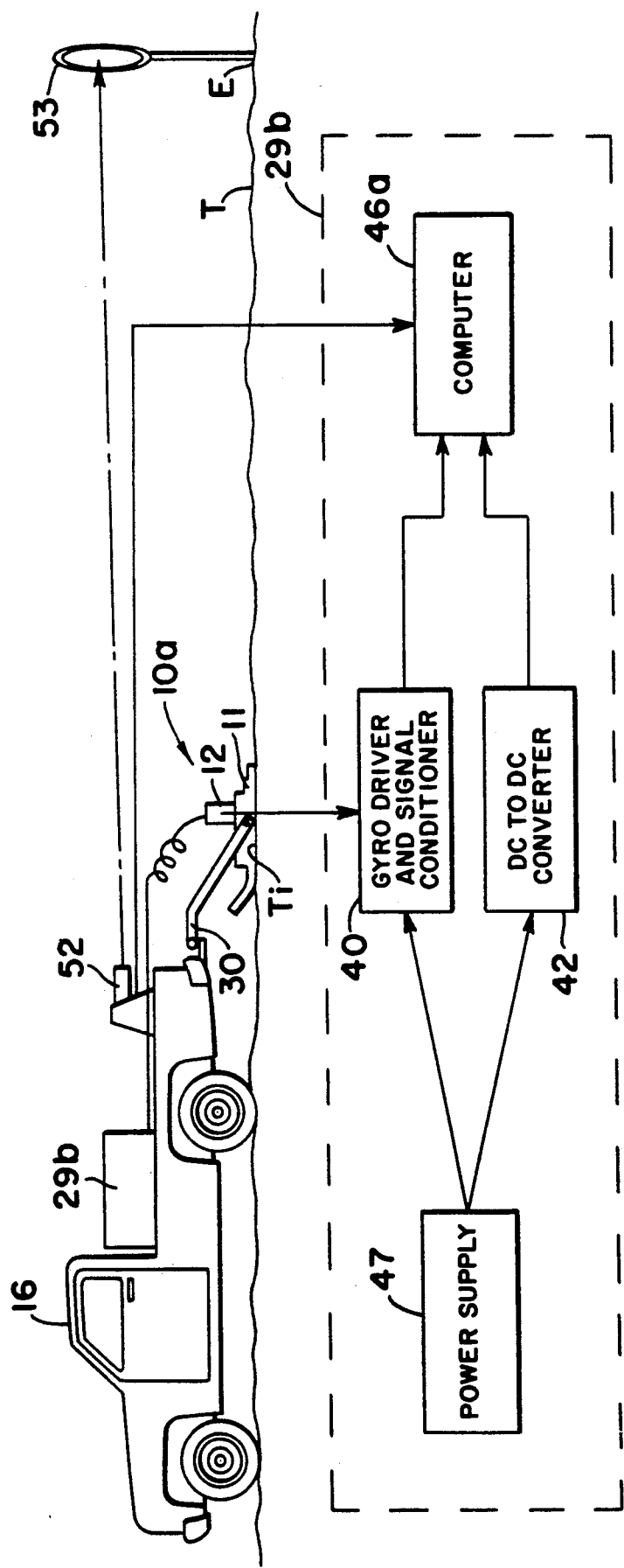
FIG_4

5,174,038

METHOD AND APPARATUS FOR PROFILING TERRAIN

The present invention pertains to apparatus for profiling terrain, and more particularly, to apparatus for providing a continuous reading of the location and slope of a terrain as the profiling apparatus moves over the terrain.

In testing the design and performance of mobile vehicles the use of computers can greatly reduce the cost. The slope, type of surface, size of terrain features and other characteristics of a terrain, along with size, weight, horsepower of a vehicle power plant and other characteristics of the vehicle can be used with a computer program to predict the performance of a particular type of vehicle. In order to test the effectiveness of the computer program a field test of a vehicle is compared with the performance predicted by the computer. Standard civil engineering techniques of measuring the elevation of the terrain at a large number of locations is slow and expensive as terrains used are often a thousand feet or more in length. What is needed is a fast, accurate and inexpensive method and apparatus for obtaining the profile of the terrain over relatively long stretches of terrain required for testing the vehicles.

SUMMARY OF THE INVENTION

The present invention includes a method and apparatus for quickly and accurately measuring the profile of terrain to be traversed by a test vehicle. A sled, or other device which closely follows the surface of the terrain, can be moved over the area used for the testing of vehicles. A level indicating means, such as a gyroscope, provides output signals which indicate the slope of the terrain under the sled. A propulsion means moves the sled along the surface of the terrain, and a measuring device provides signals which indicate the distance traveled by the sled. The slope signals and the distance signals can be used by a computer to provide a profile of the terrain traversed by the sled.

DESCRIPTION OF THE DRAWINGS

FIG. 1 is a schematic diagram of an apparatus for measuring the profile of a terrain.

FIG. 2 is a block diagram of an electronic circuit and apparatus for measuring the profile of a terrain.

FIG. 3 is a block diagram of another embodiment of an electronic circuit and apparatus for measuring the profile of a terrain.

FIG. 4 is another embodiment of the profile measuring apparatus of FIG. 1.

DESCRIPTION OF THE PREFERRED EMBODIMENT

An apparatus 10 for profiling a terrain includes a sled 11 having a gyroscope 12 mounted thereon and a prime mover 16 for pulling sled 11 across a terrain T as shown in FIG. 1. A distance measuring device 17 includes a reel 18 having a length of braided wire rope 22 extending outward over an idler wheel 23 and trained around an encoder 24. An end 22a of rope 22 is connected to a stake 28 driven into terrain T at one end of a course being profiled. Gyroscope 12 develops signals which indicate the slope of the terrain Ti immediately under sled 11. As prime mover 16 moves away from stake 28, encoder 24 develops signals which indicate the distance between encoder 24 and stake 28. The slope signals from gyroscope 12 and the distance signals from encoder 24 are coupled to a signal processing circuit 29 (FIGS. 1, 2) which develops a profile of terrain T as sled 11 moves over the terrain. A tow bar 30 has a first end 34 pivotally connected to sled 11 and a second end 35 pivotally connected to prime mover 16 so sled 11 freely follows the contour of terrain T as the sled is pulled over the terrain by prime mover 16.

Slope signals from gyroscope 12 (FIG. 2) are converted into data signals for storage on a tape recorder 36 by gyro driver and signal conditioner 40. Driver and conditioner 40 also provides power for operating gyroscope 12. As sled 11 is pulled along terrain T (FIG. 1) slope signals from gyroscope 12 are processed by driver and conditioner 40 and recorded on tape recorder 36. At the same time distance signals from encoder 24 are coupled to a counter 41 which provides pulses representing the distance which the prime mover 16 and sled 11 move along the terrain. A DC to DC converter 42 changes the distance pulses into a level which is useful to recorder 36. The slope signals and the distance signals from recorder 36 are analyzed by a computer 46 to provide a profile of the terrain over which sled 11 is being moved. Computer 46 can be mounted on prime mover 16 for processing slope and distance signals as they are supplied to recorder 36 or signals can be stored on recorder 36 and later the signals are coupled to a computer at a home base. A power supply 47 provides power to a plurality of devices including a DC to AC converter 48 which provides AC power for operating counter 41 and tape recorder 36.

Another embodiment of the signal processing circuit 29a (FIG. 3) eliminates the tape recorder shown in FIG. 2 and couples the slope signals from conditioner 40 and the distance signals from counter 41 directly to computer 46a. Computer 46a uses the slope signals and distance signals to provide a profile of terrain T (FIG. 1). Computer 46a is mounted on prime mover 16 by a plurality of springs or elastomeric mountings (not shown) to reduce shock on the computer. One type of computer that can be used on prime mover 16 is a conventional laptop computer.

Another apparatus 10a (FIG. 4) for profiling a terrain uses a sled, or other device 11 for following a surface of a terrain, and a Doppler laser generator 52 for measuring the distance to a target 53. Target 53 can be placed at an end E of an area of terrain T which is being profiled. Generator 52 directs a Doppler laser signal to target 53 which reflects the laser signal to generator 52. The signals from generator 52 are coupled to a computer 46a of signal processing circuit 29b which uses the laser signals and the prime mover speed to calculate the distance device 11 travels along terrain T. The travel distance and the slope of device 11 at a plurality of locations are used to provide a profile of the terrain over which device 11 is moved.

Thus, the present invention uses a sled and gyroscope for developing a signal which corresponds to the slope of a terrain, a prime mover for pulling the sled over the terrain, a distance measuring device and a computer for providing a profile of a terrain at a greatly reduced expense.

Although the best mode contemplated for carrying out the present invention has been herein shown and described, it will be apparent that modification and variation may be made without departing from what is regarded to be the subject matter of the invention.

What is claimed is:

1. An apparatus for profiling terrain, comprising:
a sled for slidably moving over a surface of a terrain;
a level indicating means for mounting on said sled for providing signals which indicate a slope of said sled, wherein said level indicating means includes a gyroscope mounted on said sled;
means for moving said sled along said surface of said terrain;
means for recording said slope signals from said level indicating means;
means for measuring a distance traveled by said sled, wherein the means for measuring a distance traveled by said sled measures a straight distance from the sled to an absolute point and wherein the means for measuring a distance traveled by said sled comprises a reel, a rope with a first end of the rope wrapped around the reel and a second end of the rope connected to the absolute point; and
means for using said slope and said distance traveled to provide a profile of the terrain traversed by said sled.

2. An apparatus for profiling terrain comprising:
a sled for slidably moving over a surface of a terrain;
a level indicating means for mounting on said sled for providing signals which indicate a slope of said sled, wherein said level indicating means includes a gyroscope mounted on said sled;
means for moving said sled along said surface of said terrain;
means for recording said slope signals from said level indicating means;
means for measuring a distance traveled by said sled, wherein the means for measuring a distance traveled by said sled measures a straight distance from the sled to an absolute point and wherein the means for measuring a distance traveled by said sled includes a Doppler laser generator mounted on said means for moving said sled; and
means for using said slope and said distance traveled to provide a profile of the terrain traversed by said sled.

3. An apparatus for profiling terrain comprising:
a sled for slidably moving over a surface of a terrain;
a level indicating means for mounting on said sled for providing signals which indicate a slope of said sled, wherein said level indicating means includes a gyroscope mounted on said sled;
means for moving said sled along said surface of said terrain;
means for recording said slope signals from said level indicating means;
means for measuring a distance traveled by said sled, wherein the means for measuring a distance traveled by said sled measures a straight distance from the sled to an absolute point and wherein the means for measuring a distance traveled by said sled comprises a reel, a wire rope with a first end of the wire rope wrapped around the reel, and a stake at the absolute point connected to a second end of the wire rope; and
means for using said slope and said distance traveled to provide a profile of the terrain traversed by said sled.

* * * * *

UNITED STATES PATENT AND TRADEMARK OFFICE
CERTIFICATE OF CORRECTION

PATENT NO.  : 5,174,038
DATED       : DECEMBER 29, 1992
INVENTOR(S) : RONALD J. NEYENS ET AL

It is certified that error appears in the above-identified patent and that said Letters Patent is hereby corrected as shown below:

On the title page, the name of the inventor "Porfirio L. Nogueriro" should be replaced with the name -- Porfirio L. Nogueiro --.

Signed and Sealed this

Fourteenth Day of December, 1993

Attest:

BRUCE LEHMAN

Attesting Officer        Commissioner of Patents and Trademarks